United States Patent
Kim et al.

(10) Patent No.: US 11,404,026 B2
(45) Date of Patent: Aug. 2, 2022

(54) DISPLAY DEVICE AND METHOD OF COMPENSATING FOR LUMINANCE OF DISPLAY DEVICE

(71) Applicant: Samsung Display Co., Ltd., Yongin-si (KR)

(72) Inventors: Se Yun Kim, Yongin-si (KR); Sang Cheol Park, Yongin-si (KR); Si Hun Jang, Yongin-si (KR); Min Gyu Kim, Yongin-si (KR); Hee Joon Kim, Yongin-si (KR); Jun Pyo Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/231,992

(22) Filed: Apr. 15, 2021

(65) Prior Publication Data

US 2022/0068240 A1    Mar. 3, 2022

(30) Foreign Application Priority Data

Sep. 2, 2020  (KR) .......... 10-2020-0111882

(51) Int. Cl.
*G09G 5/10* (2006.01)
*G09G 3/3275* (2016.01)
*G09G 3/20* (2006.01)

(52) U.S. Cl.
CPC ............ *G09G 5/10* (2013.01); *G09G 3/2007* (2013.01); *G09G 3/3275* (2013.01);
(Continued)

(58) Field of Classification Search
CPC ...... G09G 5/10; G09G 3/2007; G09G 3/3275; G09G 2300/026; G09G 2310/0232;
(Continued)

(56) References Cited

U.S. PATENT DOCUMENTS 6,959,117 B2* 10/2005 Ratner ................. G06T 9/00
375/E7.081
9,307,148 B1* 4/2016 Baldwin ............ H04N 5/23267
(Continued)

FOREIGN PATENT DOCUMENTS

JP        5761359 B2    8/2015
KR   10-2018-0015553 A  2/2018

*Primary Examiner* — Antonio Xavier
(74) *Attorney, Agent, or Firm* — Lewis Roca Rothgerber Christie LLP

(57) ABSTRACT

A display device according to an embodiment includes a plurality of display panels arranged adjacent to each other and each display panel including first pixels in the display panel and second pixels in the display panel and adjacent to a boundary area of the display panels, and a luminance correction unit configured to generate a correction grayscale value for the second pixel. The luminance correction unit includes an image mapping unit configured to map a captured luminance image to a unit pixel image, a de-blurring unit configured to perform a de-blurring operation on the mapped unit pixel image to calculate a correction luminance value for the second pixel, and a correction unit configured to calculate a correction grayscale value for the second pixel corresponding to the calculated correction luminance value of the second pixel.

20 Claims, 15 Drawing Sheets

(52) U.S. Cl.
CPC . *G09G 2300/026* (2013.01); *G09G 2310/027* (2013.01); *G09G 2310/0232* (2013.01); *G09G 2320/0233* (2013.01); *G09G 2360/16* (2013.01)

(58) Field of Classification Search
CPC ..... G09G 2310/027; G09G 2320/0233; G09G 2360/16
See application file for complete search history.

(56) References Cited

U.S. PATENT DOCUMENTS

| | | | |
|---|---|---|---|
| 9,464,962 B2 | 10/2016 | Kim et al. | |
| 10,430,142 B2 | 10/2019 | Jung et al. | |
| 2009/0102763 A1* | 4/2009 | Border | H04N 7/144 345/87 |
| 2010/0053450 A1* | 3/2010 | Hanamura | G06F 3/1446 348/687 |
| 2011/0102300 A1* | 5/2011 | Wood | G06F 3/1446 345/1.3 |
| 2014/0184727 A1* | 7/2014 | Xiao | H04N 5/23238 348/14.07 |
| 2015/0146017 A1* | 5/2015 | Kim | H04N 21/4318 348/189 |
| 2017/0177918 A1* | 6/2017 | Bosh | G06K 9/00026 |
| 2017/0353731 A1* | 12/2017 | Wade | H04N 19/436 |
| 2018/0040271 A1* | 2/2018 | Jung | G09G 3/2007 |
| 2019/0019474 A1* | 1/2019 | Jun | G09G 3/20 |
| 2020/0193943 A1* | 6/2020 | Iversen | G09F 9/3026 |

\* cited by examiner

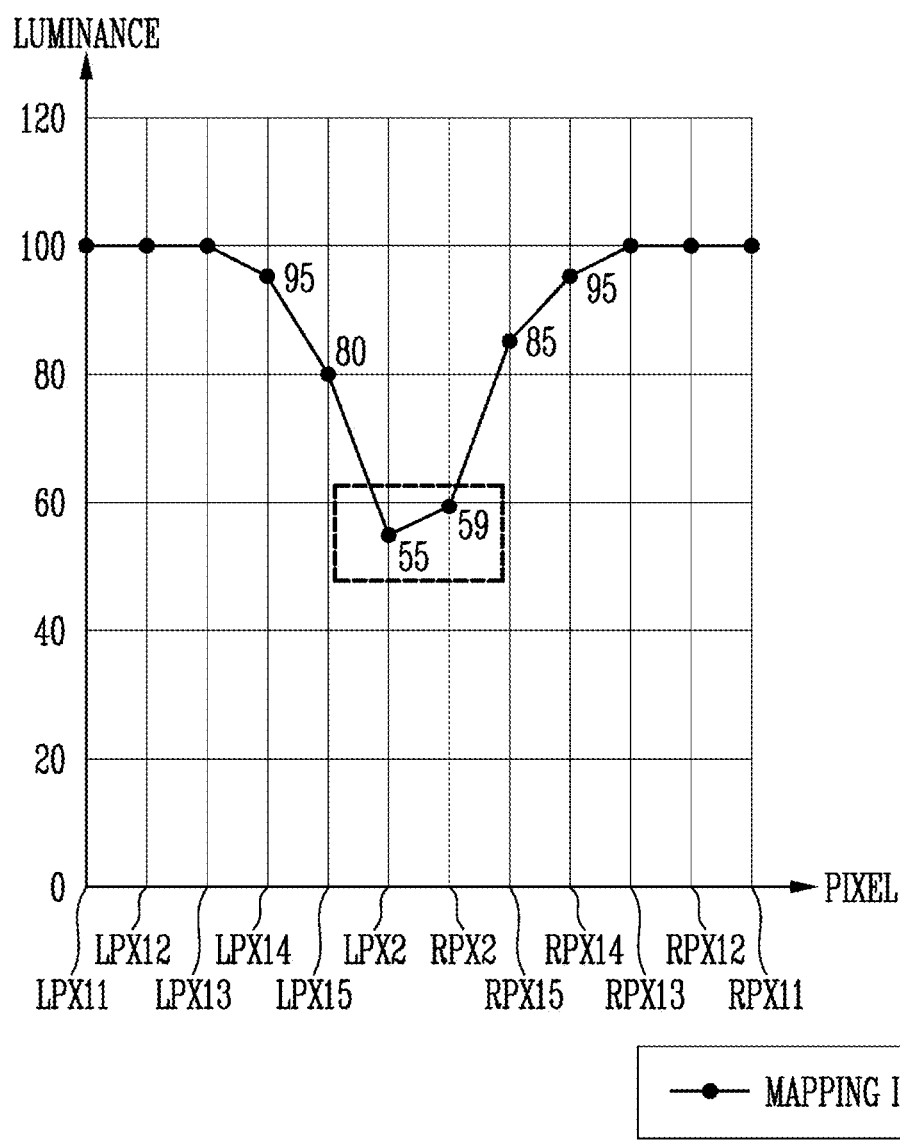

FIG. 12

| | BEFORE CORRECTION | AFTER CORRECTION | AFTER CORRECTION (De-blurring APPLICATION) |
|---|---|---|---|
| 25% (64 Gray) | | | |
| 50% (128 Gray) | | | |
| 75% (192 Gray) | | | |

DD
BA

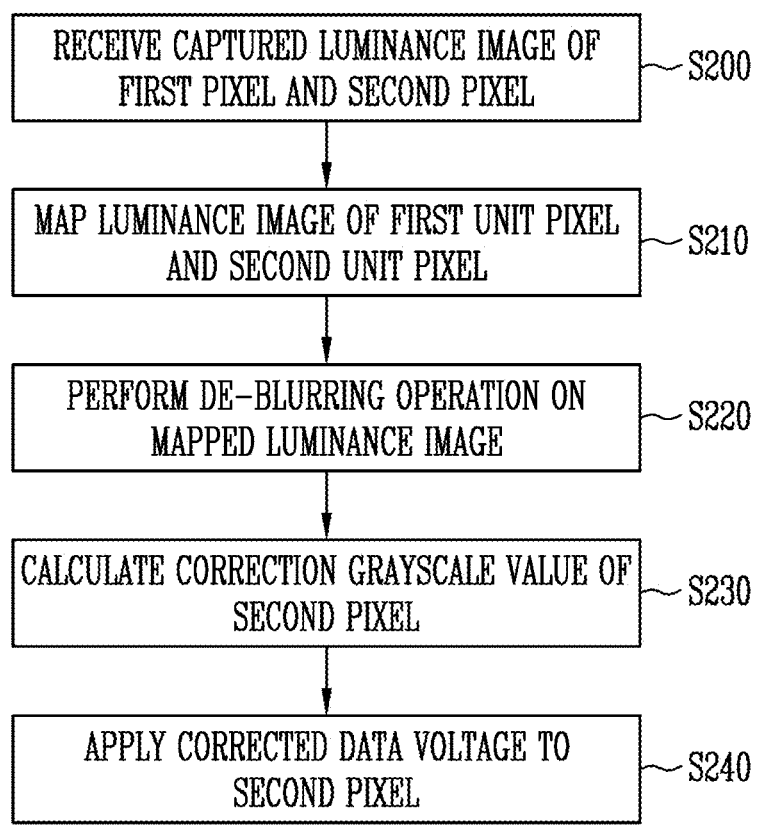

DISPLAY DEVICE AND METHOD OF COMPENSATING FOR LUMINANCE OF DISPLAY DEVICE

CROSS-REFERENCE TO RELATED APPLICATION

This application claims priority to and the benefit of Korean Patent Application No. 10-2020-0111882, filed on Sep. 2, 2020, the content of which is incorporated herein by reference in its entirety.

BACKGROUND

1. Field

The disclosure relates to a display device and a method of compensating for a luminance of the display device.

2. Description of the Related Art

As interest in an information display is increasing and a demand for using a portable information media is increasing, demand and commercialization for a display device are being focused.

SUMMARY

An objective of the disclosure is to provide a display device capable of reducing visibility of a boundary area between display panels in a display device including a plurality of display panels, and a method of compensating for a luminance of the display device.

A display device according to some example embodiments of the disclosure may include a plurality of display panels arranged adjacent to each other and each display panel including first pixels in the display panel and second pixels in the display panel and adjacent to a boundary area, and a luminance correction unit configured to generate a correction grayscale value for the second pixel. The luminance correction unit may include an image mapping unit configured to map a captured luminance image to a unit pixel image, a de-blurring unit configured to perform a de-blurring operation on the mapped unit pixel image to calculate a correction luminance value for the second pixel, and a correction unit configured to calculate a correction grayscale value for the second pixel corresponding to the calculated correction luminance value of the second pixel.

A width of the boundary area may be narrower than a distance between adjacent first pixels, and the corrected luminance value for the second pixel may be less than a luminance value of the first pixel.

A width of the boundary area may be wider than a distance between the adjacent first pixels, and the corrected luminance value for the second pixel may be greater than a luminance value of the first pixel.

The unit pixel image may include a first unit pixel image in which the captured luminance image of the first pixel is reflected, and a second unit pixel image in which the captured luminance image of the second pixel and the boundary area are reflected.

The de-blurring operation performed by the de-blurring unit may calculate the correction luminance value of the second pixel through a first de-blurring operation and a second de-blurring operation.

The de-blurring unit may be further configured to reflect a luminance value of the first unit pixel positioned closest to the boundary area, in which the first unit pixel is not affected by blur of the captured images during the first de-blurring operation.

The de-blurring unit may be further configured to calculate the correction luminance value of the second pixel by reflecting an operation value determined by the first de-blurring operation and an initial luminance value of the second unit pixel during the second de-blurring operation.

The correction grayscale value of the second pixel may be calculated as a difference between a grayscale value corresponding to a target luminance value of the second pixel and a grayscale value corresponding to a correction luminance value of the second pixel.

Each of the plurality of display panels may include a display unit including the first pixels and the second pixels, and a data driver configured to apply a data voltage to a plurality of data lines coupled to the first pixels and the second pixels.

The data driver may apply a corrected data voltage corresponding to the correction grayscale value of the second pixel to data lines connected to the second pixels.

A display device including a plurality of display panels arranged adjacent to each other with a boundary area interposed between the plurality of display panels according to some example embodiments may include a display unit including first pixels in the display unit and second pixels adjacent to the boundary area of the plurality of display panels, a data driver configured to apply a data voltage to a plurality of data lines coupled to the first pixels and the second pixels, an image mapping unit configured to map a captured luminance image to a unit pixel image, a de-blurring unit configured to perform a de-blurring operation on the mapped unit pixel image to calculate a correction luminance value of the second pixel, and a correction unit configured to calculate a correction grayscale value of the second pixel corresponding to the calculated correction luminance value of the second pixel.

The data driver may be further configured to apply a corrected data voltage corresponding to the correction grayscale value of the second pixel to data lines coupled to the second pixels.

The unit pixel image may include a first unit pixel image in which the captured luminance image of the first pixel is reflected, and a second unit pixel image in which the captured luminance image of the second pixel and the boundary area are reflected.

The de-blurring operation performed by the de-blurring unit may calculate the correction luminance value of the second pixel through a first de-blurring operation and a second de-blurring operation.

The de-blurring unit may be further configured to reflect a luminance value of the first unit pixel positioned closest to the boundary area, in which the first unit pixel is not affected by blur among the captured images during the first de-blurring operation.

The de-blurring unit may be further configured to calculate the correction luminance value of the second pixel by reflecting an operation value determined by the first de-blurring operation and an initial luminance value of the second unit pixel during the second de-blurring operation.

A method of compensating for a luminance of a display device including a plurality of display panels arranged adjacent to each other with a boundary area interposed between the plurality of display panels according to some example embodiments may include receiving a captured luminance image of a first pixel and a captured luminance image of a second pixel, mapping the luminance image of the first pixel and the luminance image of the second pixel, respectively, to an image of a first unit pixel and a second unit pixel, performing a de-blurring operation on the mapped images of the first unit pixel and the second unit pixel, and calculating a correction grayscale value of the second pixel by using a luminance correction value of the second pixel obtained by the de-blurring operation.

The method may further include applying a data voltage corresponding to the calculated correction grayscale value of the second pixel to the second pixel.

The method may further include compensating a luminance value of the second pixel with a luminance value less than a luminance value of the first pixel, wherein a width of the boundary area is narrower than a distance between adjacent first pixels.

The method may further include compensating a luminance value of the second pixel with a luminance value greater than a luminance value of the first pixel, wherein a width of the boundary area is wider than a distance between adjacent first pixels.

According to some example embodiments, in a display device including a plurality of display panels, visibility of a boundary area between a plurality of display devices may be reduced by correcting a luminance of pixels adjacent to the boundary area. Accordingly, luminance uniformity of the display device may be ensured.

An effect according to an embodiment of the disclosure is not limited to the contents illustrated above, and more various effects are included in the present specification.

BRIEF DESCRIPTION OF THE DRAWINGS

The above and other features of the disclosure will become more apparent by describing in further detail aspects of some example embodiments thereof with reference to the accompanying drawings, in which:

FIGS. 9A, 9B, 9C, and 9D are diagrams illustrating an operation of a de-blurring unit, according to an embodiment;

FIG. 12 is a diagram illustrating an effect in which visibility of the boundary area is reduced in the display device, according to some example embodiments; and FIG. 13 is a flowchart illustrating a method of compensating for a luminance of the display device, according to some example embodiments.

DETAILED DESCRIPTION

Figure 1:
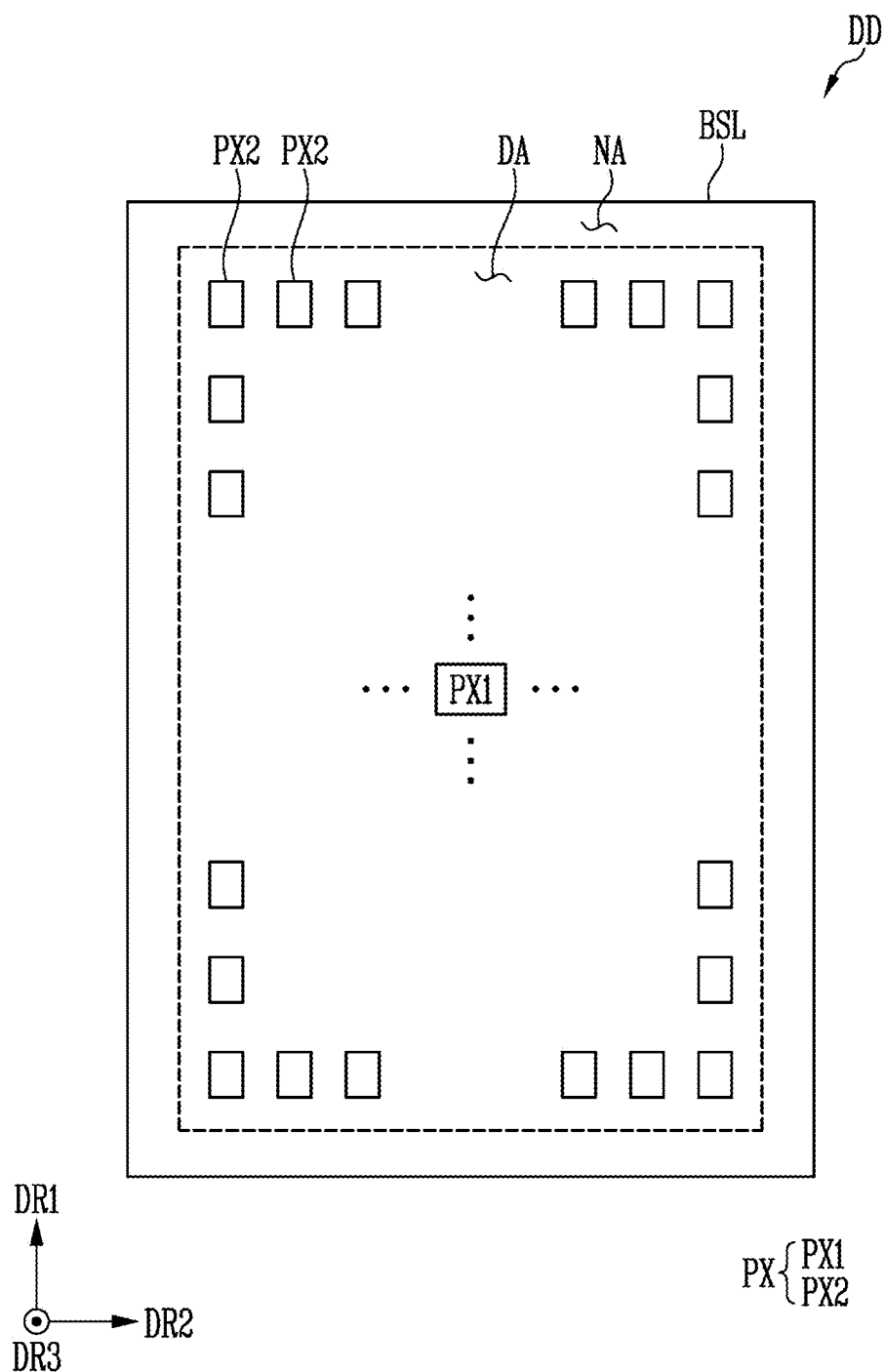
FIG. 1 is a schematic plan view of one display device among display devices, according to some example embodiments.

Embodiments according to the present disclosure may be modified in various manners and have various forms. Therefore, aspects of some example embodiments will be illustrated in the drawings and will be described in more detail in the specification. However, it should be understood that embodiments according to the present disclosure are not intended to be limited to the disclosed specific forms, but instead the disclosure includes all modifications, equivalents, and substitutions within the spirit and technical scope of the disclosure.

Terms such as "first," "second," and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. The singular expressions include plural expressions unless the context clearly indicates otherwise.

It should be understood that in the present application, terms such as "include," "have," or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance. In addition, a case where a portion of a layer, a film, an area, a plate, or the like is referred to as being "on" another portion, it includes not only a case where the portion is "directly on" another portion, but also a case where there is further another portion between the portion and another portion. In addition, in the present specification, when a portion of a layer, a film, an area, a plate, or the like is formed on another portion, the portion is not limited to being formed on an upper side (e.g., a top surface) of another portion but also includes forming the portion on a side surface or on a lower side (e.g., an underside surface). On the contrary, when a portion of a layer, a film, an area, a plate, or the like is formed "under" another portion, this includes not only a case where the portion is "directly beneath" another portion but also a case where there is further another portion between the portion and another portion.

Hereinafter, a display device according to some example embodiments of the disclosure is described with reference to the drawings related to embodiments of the disclosure.

FIG. 1 is a schematic plan view of one display device among display devices according to some example embodiments.

According to some example embodiments, the display device DD may be implemented as a display device such as an organic light emitting diode display device (OLED display device), an ultra-small light emitting diode display device (nano-scale LED display device), a quantum dot organic light emitting diode display device (QD OLED device), or a quantum dot ultra-small light emitting diode display device (quantum dot nano-scale LED display device, QD nano LED device). In addition, the display device may be a display device including a display panel such as an organic light emitting diode display panel, an ultra-small light emitting diode display panel, a quantum dot organic light emitting diode display panel, or a quantum dot ultra-small light emitting diode display panel.

According to some example embodiments, the display device DD includes a display area DA and a non-display area NA. The display area DA is an area including a plurality of pixels PX to display an image, and the non-display area NA is an area excluding the display area DA and is an area in which an image is not displayed. The non-display area NA may be a bezel area surrounding the display area DA, and may be an area contacting each other between two or more adjacent display devices DD. In other words, when two more display devices are adjacent each other, the non-display area NA of one display device may be in contact with the non-display area NA of the adjacent display device. Accordingly, the non-display area NA may be a portion of a boundary area that is an area between two or more display devices DD.

According to some example embodiments, the display area DA includes a plurality of pixels PX. More specifically, the display area DA includes first pixels PX1 positioned therein and second pixels PX2 adjacent to the boundary area. The display area DA may be positioned on one surface of the display device DD. For example, the display area DA may be positioned on a front surface of the display device DD, and may be additionally positioned on a side surface and a rear surface of the display device DD.

The non-display area NA may be positioned around the display area DA to surround the display area DA, and may selectively include lines, pads, a driving circuit, and the like coupled (e.g., connected) to the pixels PX of the display area DA.

The pixels PX may be provided in the display area DA of a base layer BSL. Each of the pixels PX may be a minimum unit for displaying an image. The pixels PX may include a light emitting element that emits a white light and/or a color light. Each of the pixels PX may emit any one of red, green, and blue, but is not limited thereto, and may emit a color such as cyan, magenta, or yellow. In the drawing (e.g., FIG. 1), the pixel PX is shown as having a rectangular shape, but the disclosure is not limited thereto and may be variously modified.

In FIG. 1, the plurality of pixels PX are distributed and arranged in a matrix structure, but the disclosure is not limited thereto. According to some example embodiments, the pixels PX may be arranged in the display area DA, for example, in a stripe or an RGBG matrix structure (e.g., PENTILE®).

Hereinafter, a display device according to an embodiment including a plurality of display devices is described with reference to FIGS. 2 to 4B.

Figure 2:
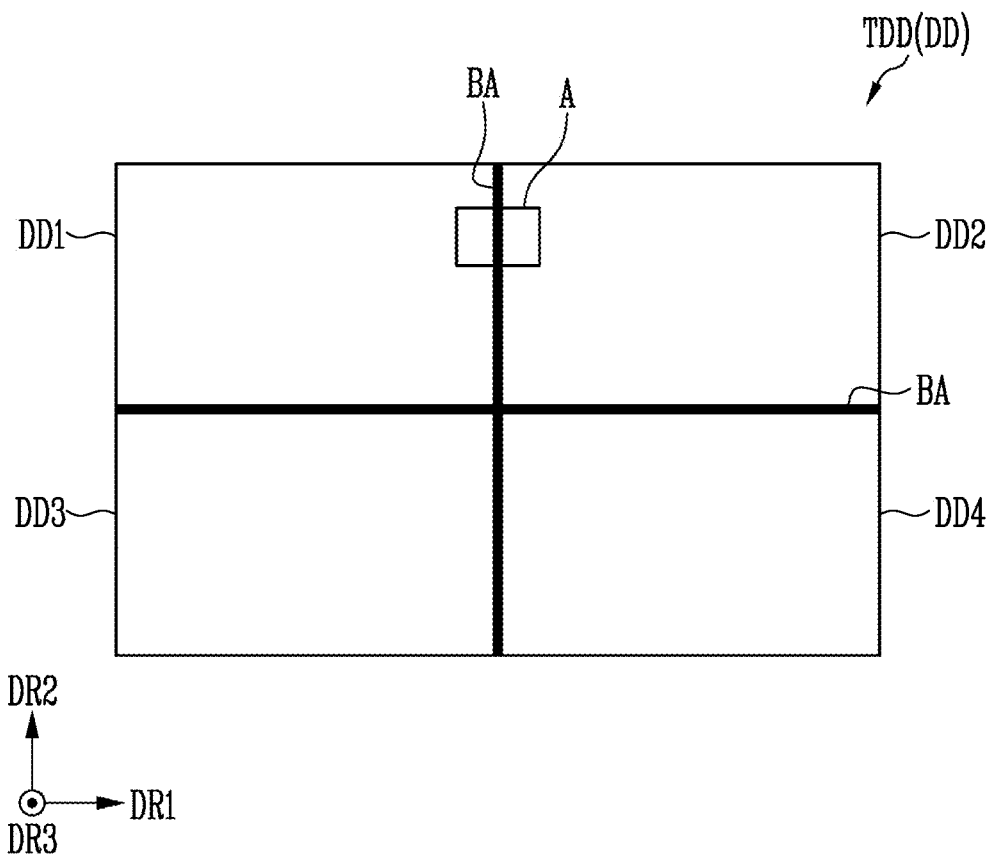
FIG. 2 is a plan view illustrating the display device, according to some example embodiments.

FIG. 2 is a plan view illustrating the display device according to some example embodiments, and FIGS. 3A, 3B, 4A, and 4B are plan views illustrating a portion of the display device including a boundary area in the display device according to some example embodiments. The portion shown in FIGS. 3A to 4B is an enlarged portion A of FIG. 2.

According to some example embodiments, the display device DD may be a multi-screen display device TDD comprised of a plurality of display devices. The multi-screen display device TDD (also referred to as a "tiled display") may include a plurality of display devices DD1, DD2, DD3, and DD4 arranged in a matrix form along a first direction DR1 and a second direction DR2.

The plurality of display devices DD1, DD2, DD3, and DD4 may display individual images on each display device DD1, DD2, DD3, and DD4 or may divide and display one image. Each of the plurality of display devices DD1, DD2, DD3, and DD4 may include display panels of the same type, structure, size, or method, but are not limited thereto. The plurality of display devices DD1, DD2, DD3, and DD4 may be physically combined by a housing that may be positioned under (or behind) the plurality of display devices DD1, DD2, DD3, and DD4 so as to hold the display devices DD1, DD2, DD3, and DD4 together form one multi-screen display device TDD.

The plurality of display devices DD1, DD2, DD3, and DD4 may be implemented in various shapes or arrangements. In FIG. 2, the plurality of display devices DD1, DD2, DD3, and DD4 have a rectangular plate shape, but the disclosure is not limited thereto, and each of the plurality of display devices DD1, DD2, DD3, and DD4 may have a shape such as a circular shape or an elliptical shape.

In the plurality of display devices DD1, DD2, DD3, and DD4, an image displayed on the screen of the multi-screen display device TDD may appear disconnected due to the non-display area NA forming the boundary area BA between the plurality of display devices DD1, DD2, DD3, and DD4. In particular, when a width (or the area) of the non-display area NA is relatively large, a sense of discontinuity of the image may be deepened (e.g., more apparent) in the boundary area BA between the plurality of display devices DD1, DD2, DD3, and DD4. The non-display area NA positioned in the boundary area BA between the plurality of display devices DD1, DD2, DD3, and DD4 may be referred to as a seam area, an assembly seam area, or a dead space area.

In addition, the boundary area BA between the plurality of display devices DD1, DD2, DD3, and DD4 may be visually recognizable, and thus a luminance of the image displayed on the screen of the multi-screen display device TDD may be reduced.

In the plurality of display devices according to some example embodiments, visibility of the boundary area BA may be reduced by correcting a luminance of the second pixel PX2 adjacent to the boundary area BA.

Figure 3A:
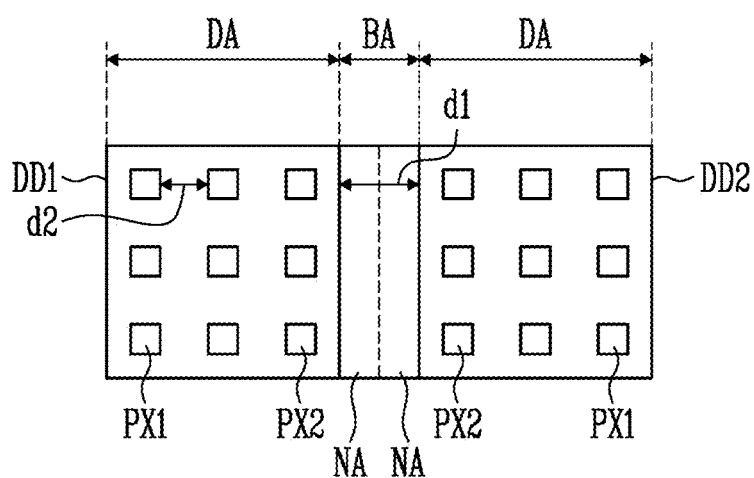
FIGS. 3A, 3B, 4A, and 4B are plan views illustrating a portion of the display device including a boundary area in the display device, according to some example embodiments.
Figure 3B:
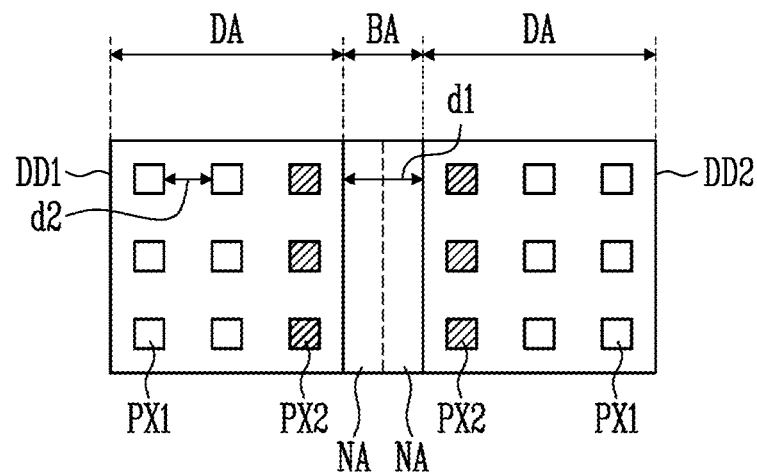

First, referring to FIGS. 3A and 3B, a case where a width d1 of the boundary area BA between the plurality of display devices DD1 and DD2 is wider than a distance d2 between the first pixels PX1 inside the display device DD is described.

Hatching of the second pixels PX2 shown in the display device DD of FIG. 3B indicates that the luminance of the second pixels PX2 shown in the display device DD of FIG. 3B is brighter than the luminance of the second pixels PX2 shown in the display device DD of FIG. 3A.

When the width d1 of the boundary area BA is wider than the distance d2 between the first pixels PX1 inside the display device DD, the display device DD according to an embodiment may correct the luminance of the second pixels PX2 adjacent to the boundary area BA so that the luminance of the second pixels PX2 adjacent to the boundary area BA is brighter than that of the first pixels PX1 when implementing a luminance corresponding to the same grayscale. Accordingly, in the multi-screen display device TDD, visibility of the boundary area BA may be reduced, and an image having a more uniform luminance as a whole may be displayed. In other words, the boundary area BA may be less noticeable because the second pixels PX2, which are adjacent the boundary area BA, are brighter than the other pixels, and therefore the luminance of the image may appear to be more uniform.

Figure 4A:
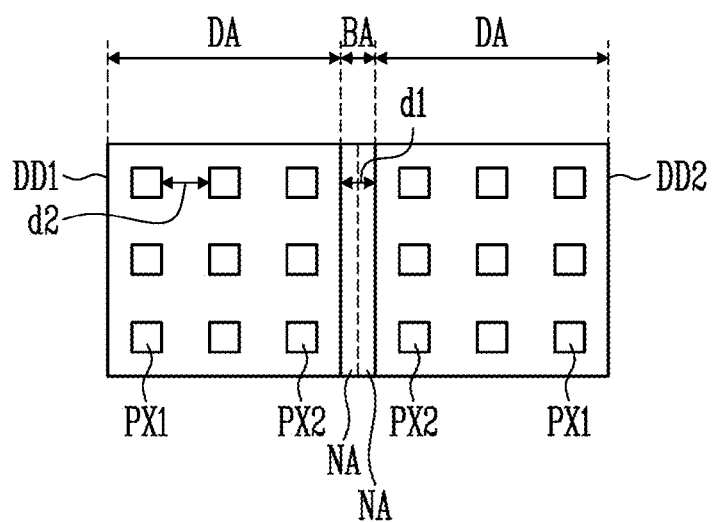
Figure 4B:
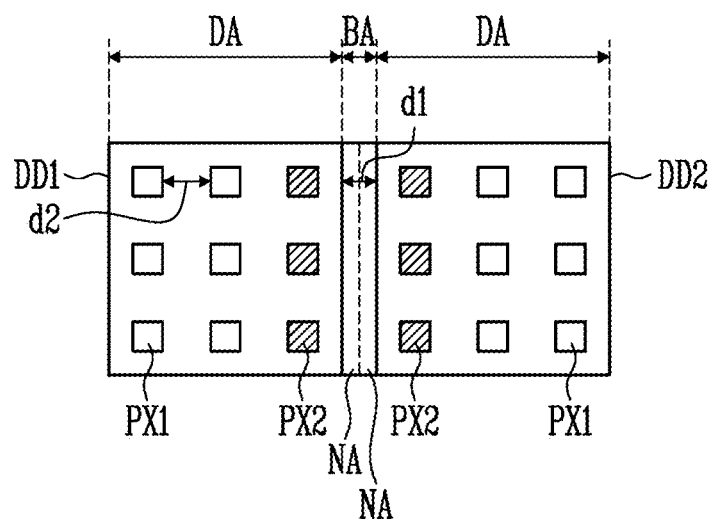

Referring to FIGS. 4A and 4B, a case where the width d1 of the boundary area BA between the plurality of display devices DD1 and DD2 is narrower than the distance d2 between the first pixels PX1 inside the display device DD is described.

Hatching of the second pixels PX2 shown in the display device DD of FIG. 4B indicates that the luminance of the second pixels PX2 shown in the display device DD of FIG. 4B is darker than the luminance of the second pixels PX2 shown in the display device DD of FIG. 4A.

When the width d1 of the boundary area BA is narrower than the distance d2 between the first pixels PX1 inside the display device DD, the display device DD according to an embodiment may correct the luminance of the second pixels PX2 adjacent to the boundary area BA so that the luminance of the second pixels PX2 adjacent to the boundary area BA is darker than that of the first pixels PX1 when implementing a luminance of the same grayscale. Accordingly, in the multi-screen display device TDD, visibility of the boundary area BA may be reduced, and an image having a more uniform luminance as a whole may be displayed. In other words, the boundary area BA may be less noticeable because the second pixels PX2, which are adjacent the boundary area BA, are darker than the other pixels, and therefore the luminance of the image may appear to be more uniform.

According to some example embodiments, the visibility of the boundary area BA between the plurality of display devices DD may be weakened or reduced by a luminance correction unit and an image processing method. Hereinafter, the luminance correction unit and the image processing method are described in more detail. First, the luminance correction unit is described with reference to FIG. 5.

Figure 5:
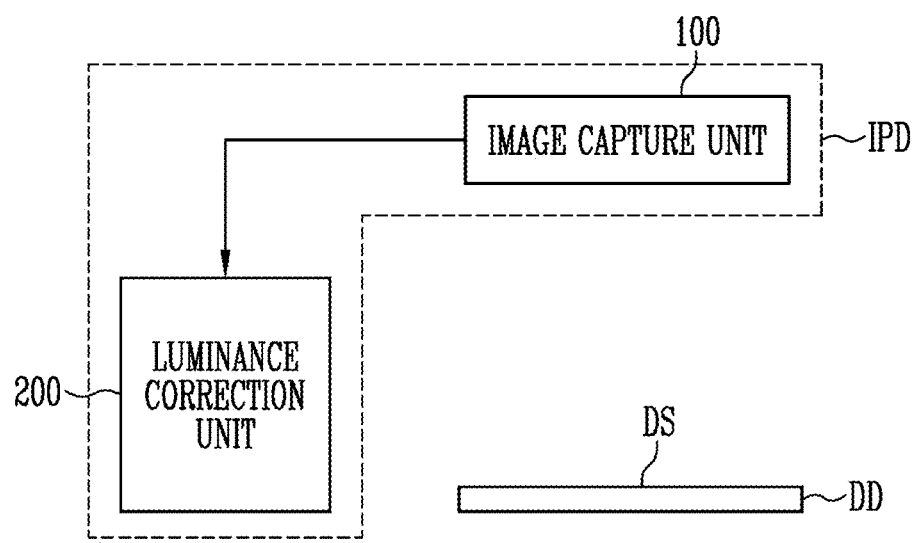
FIG. 5 is a conceptual diagram illustrating image processing of the display device, according to some example embodiments.

FIG. 5 is a conceptual diagram illustrating image processing of the display device according to some example embodiments.

Referring to FIG. 5, image processing of the display device according to an embodiment may be performed by an image capture unit 100 and a luminance correction unit 200.

In FIG. 5, the image capture unit 100 and the luminance correction unit 200 are included in an image processing device IPD according to some example embodiments. In other embodiments, the image capture unit 100 and the luminance correction unit 200 may be included in the image processing device IPD, the image capture unit 100 may be included in a separate inspection device, a processing device, and the like, and the luminance correction unit 200 may be included as a configuration of the display device DD.

According to some example embodiments, the image capture unit 100 captures a luminance image of the display device DD and provides the captured luminance image to the luminance correction unit 200. The image capture unit 100 may capture a luminance image of the entire area of a display surface DS of the display device DD. More specifically, the image capture unit 100 may capture a luminance of the image related to a partial area of the non-display area NA of FIG. 1 and the display area DA of FIG. 1 such that the boundary area BA of FIG. 2 between the plurality of display devices DD is also included.

The image capture unit 100 may include a light receiving element such as a charge-coupled device (CCD) camera. In other embodiments, the image capture unit 100 may not include a light receiving element, but may instead, be connected to an external light receiving element to receive a luminance image captured by the external light receiving element.

According to some example embodiments, the luminance correction unit 200 generates a correction grayscale value for correcting the luminance of the second pixel PX2 adjacent to the boundary area BA based on the captured luminance image to correct the luminance of the second pixel PX2.

The luminance correction unit 200 may calculate the correction luminance value of the second pixel PX2 by mapping the luminance image of the first pixel PX1 positioned inside the display device (or the display panel DD) and the luminance image of the second pixel PX2 positioned adjacent to the boundary area BA of the display device (or the display panel DD) to a unit pixel image, and performing a de-blurring operation on the mapped unit luminance image. In some embodiments, the luminance correction unit 200 may generate a correction grayscale value corresponding to the calculated luminance of the second pixel PX2, provide the correction grayscale value to a timing controller and/or a data driver (which is described later), and compensate for the luminance of the second pixel PX2. The luminance correction unit 200 is described in detail with reference to FIG. 7.

Hereinafter, a configuration of the display device according to an embodiment is described with reference to FIG. 6.

Figure 6:
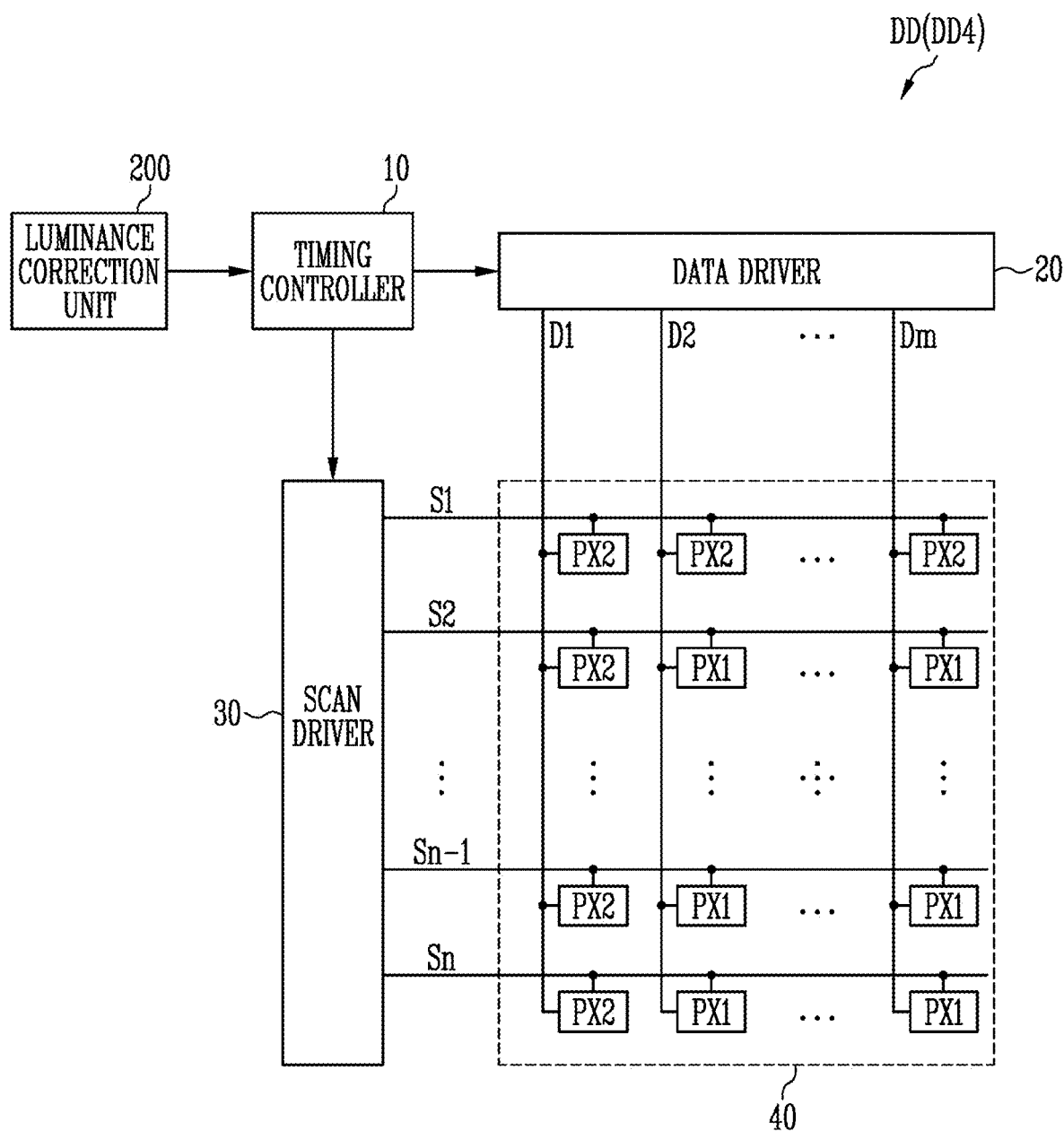
FIG. 6 is a block diagram of the display device, according to some example embodiments.

FIG. 6 is a block diagram of the display device according to some example embodiments.

Referring to FIG. 6, the display device DD according to an embodiment may include a timing controller 10, a data driver 20, a scan driver 30, and a display unit 40. In addition, according to some example embodiments, the display device DD may further include the luminance correction unit 200.

The display device DD of FIG. 6 may correspond to one display device DD4 of the multi-screen display devices TDD shown in FIG. 2.

The timing controller 10 may provide a clock signal, a scan start signal, and the like to the scan driver 30 so that the clock signal, the scan start signal, and the like are suitable for a specification of the scan driver 30 based on control signals received from an external processor. The external processor may be an application processor (AP), a central processing unit (CPU), a graphics processing unit (GPU), a micro controller unit (MCU), or other host system. For example, the control signals may include a data enable signal, a vertical synchronization signal, a horizontal synchronization signal, a target maximum luminance, and the like.

The timing controller 10 may provide modified or maintained grayscale values (e.g., a modified grayscale value or maintain the same grayscale value) and control signals to the data driver 20 so that the grayscale values and control signals are suitable for a specification of the data driver 20 based on grayscale values and control signals received from the external processor.

In some embodiments, the timing controller 10 may provide correction grayscale values received from the luminance correction unit 200 to the data driver 20. In such embodiments, the correction grayscale values may be values corresponding to the second pixels PX2 adjacent to the boundary area BA of the display devices DD.

The data driver 20 may generate data voltages to be provided to data lines D1 to Dm based on the grayscale values and the control signals received from the timing controller 10. For example, the data voltages generated in a pixel row unit may be simultaneously applied to the data lines D1 to Dm according to an output control signal included in the control signal.

In some embodiments, the data driver 20 may apply corrected data voltages to the data lines D1 to Dm coupled (e.g., connected) to the second pixels PX2 using the correction grayscale values of the second pixels PX2 received from the timing controller 10.

The scan driver 30 may receive control signals such as a clock signal and a scan start signal from the timing controller 10 to generate scan signals to be provided to scan lines S1 to Sn. For example, the scan driver 30 may sequentially provide scan signals corresponding to a turn-on level (e.g., a voltage level that turns on the pixels) to the scan lines S1 to Sn. For example, the scan driver 30 may be configured as a shift register, and may generate the scan signals by sequentially transferring a scan start signal to the next stage circuit according to control of the clock signal.

According to some example embodiments, the display unit 40 includes pixels PX1 and PX2. Each of the pixels PX1 and PX2 may be coupled (e.g., connected) to a corresponding data line and a scan line. For example, when data voltages for one pixel row are applied to the data lines D1 to Dm from the data driver 20, the data voltages may be written to a pixel row positioned on a scan line receiving the turn-on level scan signal.

The first pixels PX1 may be arranged inside the display unit 40, and the second pixels PX2 may be arranged along an edge portion of the display unit 40. An area adjacent to the edge portion in which the second pixels PX2 are arranged may be the boundary area BA of FIG. 2, and may be an area adjacent to the display unit 40 of another display device DD. The correction grayscale values are applied to the second pixels PX2 from the data lines D1 to Dm connected respectively, and thus the luminance of the second pixels PX2 may be corrected. That is, the luminance of these second pixels PX2 may be corrected to a brighter or a darker luminance.

Although, in FIG. 6, the luminance correction unit 200, the timing controller 10, the data driver 20, and the scan driver 30 are separately shown, but the disclosure is not limited thereto.

According to some example embodiments, the luminance correction unit 200 may be integrally configured with the timing controller 10 and/or the data driver 20. According to some example embodiments, the correction grayscale values may be stored in advance in an internal memory of the timing controller 10 and/or the data driver 20.

Hereinafter, the luminance correction unit is described in more detail with reference to FIGS. 7 to 10.

Figure 7:
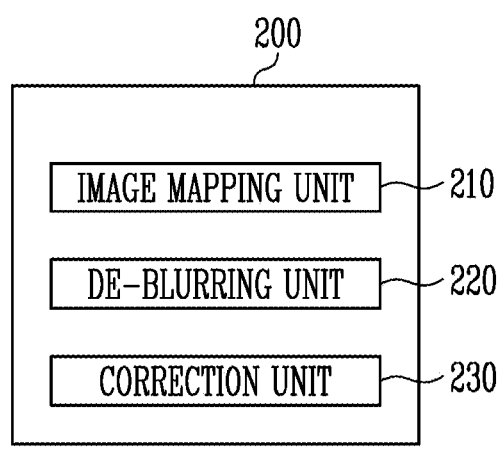
FIG. 7 is a block diagram illustrating a luminance correction unit, according to some example embodiments.
Figure 8:
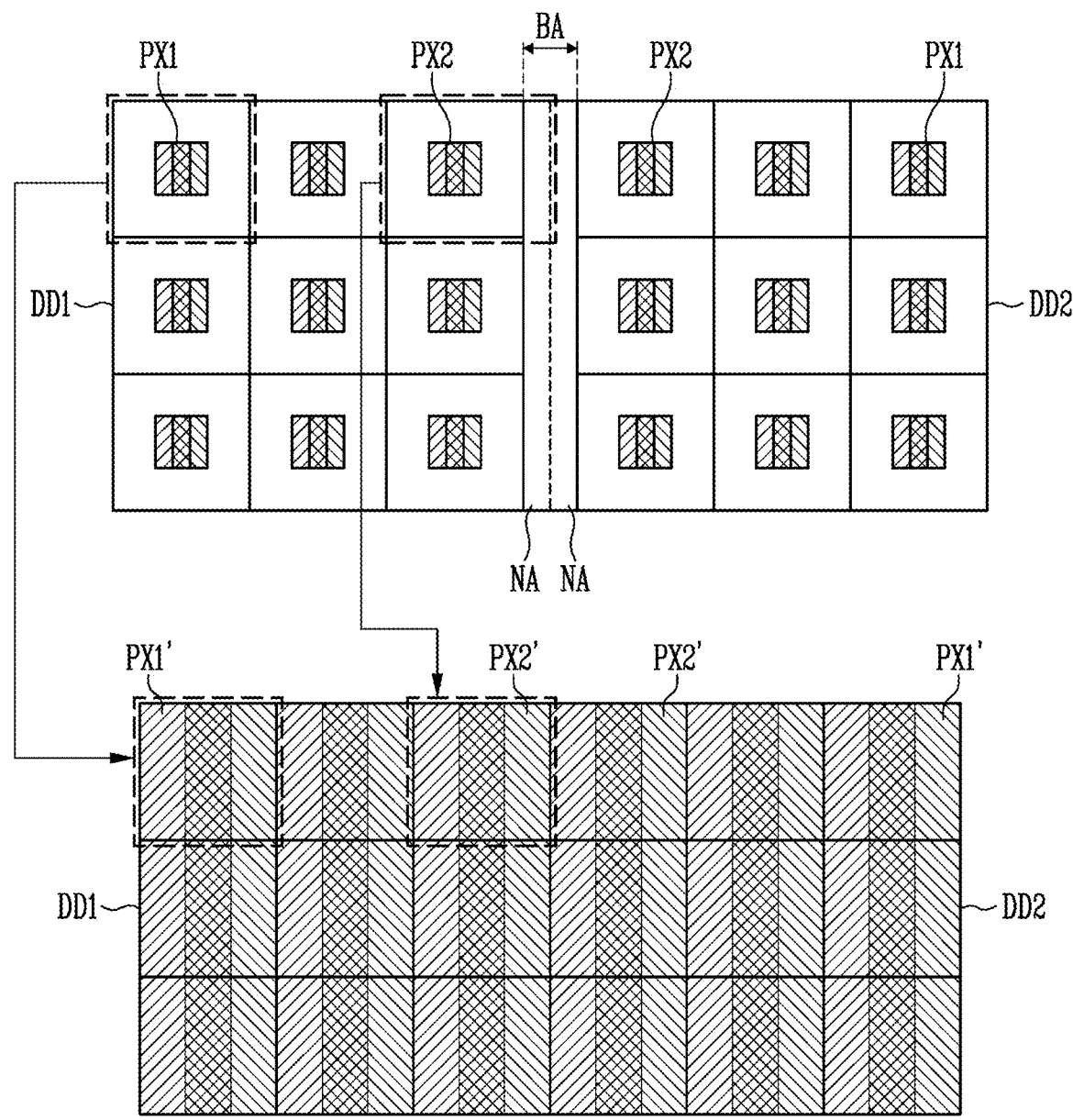
FIG. 8 is a diagram illustrating an operation of an image mapping unit, according to some example embodiments.

FIG. 7 is a block diagram illustrating the luminance correction unit 200 according to some example embodiments. FIG. 8 is a diagram illustrating an operation of an image mapping unit according to some example embodiments. FIGS. 9A, 9B, 9C, and 9D are diagrams illustrating an operation of a de-blurring unit according to some example embodiments. FIG. 10 is a diagram illustrating an operation of a correction unit according to some example embodiments.

Referring to FIG. 7, the luminance correction unit 200 according to an embodiment may include the image mapping unit 210, the de-blurring unit 220, and the correction unit 230.

The image mapping unit 210 receives the captured luminance image from the image capture unit 100, maps the captured luminance image, and provides the captured luminance image to the de-blurring unit 220.

The image mapping unit 210 may reflect a luminance of the captured first pixel PX1 to map the first pixel PX1 to a first unit pixel PX1', and may reflect a luminance of the captured second pixel PX2 and a luminance of the boundary area BA adjacent to the second pixel PX2 to map the second pixel PX2 and the boundary area BA to a second unit pixel PX2'. Here, each unit pixel may correspond to a position of each pixel of the display panel. For example, the first pixel PX1 positioned at (1, 1) of the display panel may correspond to the first unit pixel PX1' located at (1, 1) of the mapped image, and the second pixel PX2 positioned at (1, 3) of the display panel and the boundary area BA adjacent to the second pixel PX2 positioned at (1, 3) may correspond to the second unit pixel PX2' located at (1, 3) of the mapped image. The image capture unit 100 may include at least one light receiving element, and the image mapping unit 210 may receive a captured image from each light receiving element and map the captured image to one image.

Referring to FIG. 8, a luminance image of a pixel captured by the image capture unit 100 is shown in the upper half of the figure, and an image of a unit pixel mapped by the image mapping unit 210 is shown in the lower half of the figure.

For example, the image capture unit 100 may capture a luminance of 3×2 first pixels PX1 and 3×1 second pixels PX2 in the first display device DD1 (or the first display panel), a luminance of 3×2 first pixels PX1 and 3×1 second pixels PX2 in the second display device DD2 (or the second display panel), and a luminance of the boundary area BA between the first display device DD1 and the second display device DD2, and may provide a corresponding image to the image mapping unit 210.

The image mapping unit 210 may generate an image of 3×2 first unit pixels PX1' corresponding to the luminance of the 3×2 first pixels PX1 in the first display device DD1, and generate an image of 3×1 second unit pixels PX2' in which the luminance of the 3×1 second pixels PX2 and the luminance of the boundary area BA are reflected. In addition, the image mapping unit 210 may generate an image of 3×2 first unit pixels PX1' corresponding to the luminance of the 3×2 first pixels PX1 in the second display device DD2, and generate an image of 3×1 second unit pixels PX2' in which the luminance of the second pixels PX2 and the luminance of the boundary area BA are reflected. In the boundary area BA, the non-display area NA of the first display device DD1 may be mapped to the image of the second unit pixel PX2' together with the second pixel PX2 of the first display device DD1, and the non-display area NA of the second display device DD2 may be mapped to the image of the second unit pixel PX2' together with the second pixel PX2 of the second display device DD2.

Figure 9A:
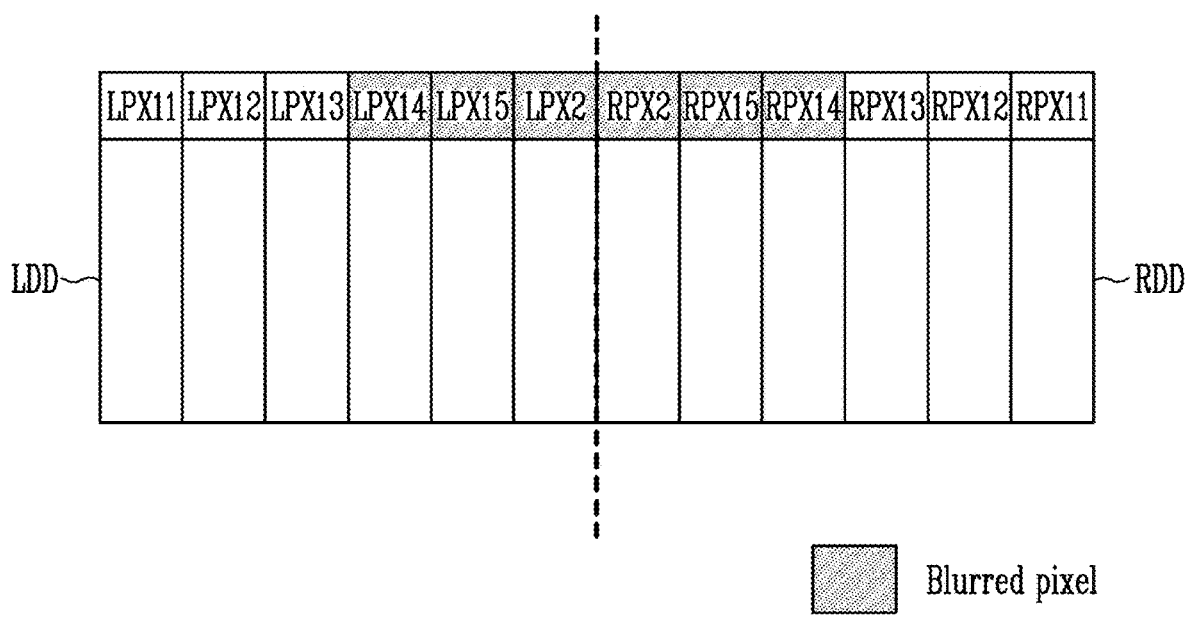
Figure 10:
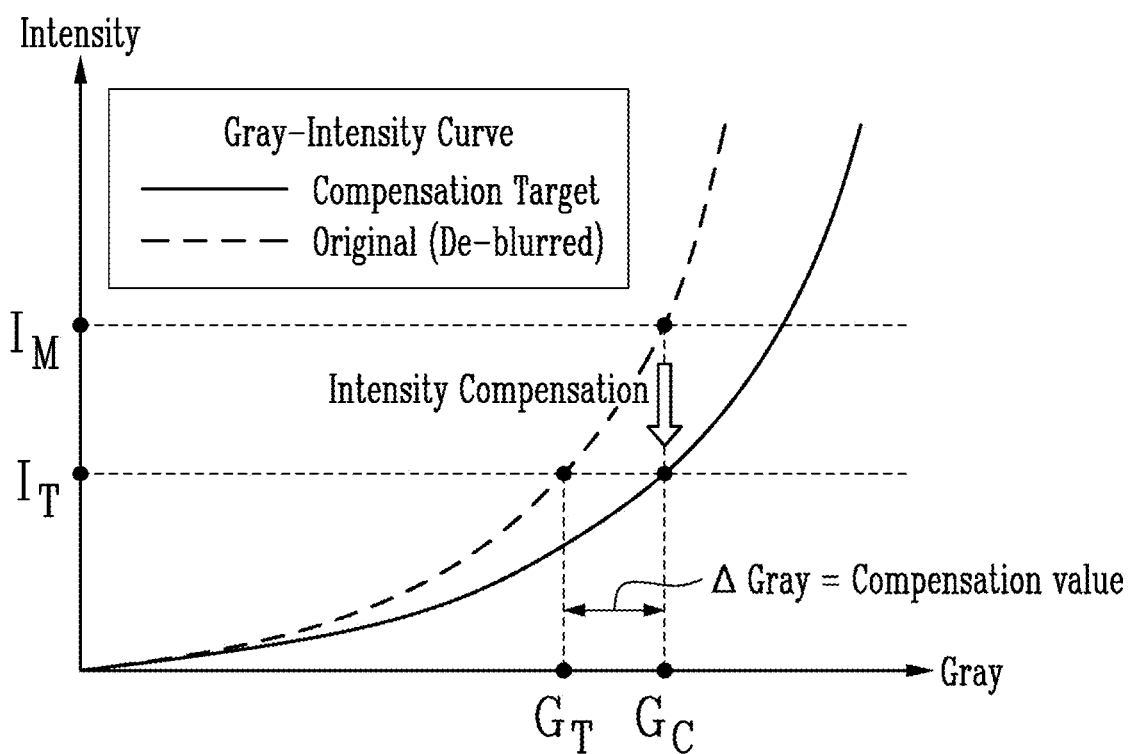
FIG. 10 is a diagram illustrating an operation of a correction unit, according to some example embodiments.

With reference to FIG. 9A, in the captured image, a boundary between first pixels LPX14, LPX15, RPX14, and RPX15 (or the first unit pixel) and/or second pixels LPX2 and RPX2 (or the second unit pixel) with the boundary area BA interposed therebetween may be unclear due to a blur phenomenon, and thus it may be difficult to correct the luminance value of the second pixels because the correction luminance value may not be properly calculated (e.g., due to the blur phenomenon). Therefore, before calculating the correction luminance value of the second pixels LPX2 and RPX2, a de-blurring procedure is performed.

According to some example embodiments, the de-blurring unit 220 calculates the correction luminance value of the second pixel PX2 by performing a de-blurring operation on the mapped unit pixel image.

First, the de-blurring unit 220 may derive a luminance value obtained by a first de-blurring operation through Equation 1 or Equation 2 below. According to some example embodiments, the first de-blurring operation is referred to as a first de-blurring operation, and the luminance value obtained by the first de-blurring operation is referred to as a first de-blurring luminance value.

Equation 1 is an equation for calculating the luminance correction value of the second pixel PX2 when the luminance of the second pixel PX2 is to be corrected to be darker than the luminance of the first pixel PX1 because the distance between the plurality of display devices DD is narrow (e.g., narrower than the distance between the first pixels PX1) (referred to herein "dark seam"). Equation 2 is an equation for calculating the luminance correction value of the second pixel PX2 when the luminance of the second pixel PX2 is to be corrected to be brighter than the luminance of the first pixel PX1 because the distance between the plurality of display devices DD is wide (e.g., wider than the distance between the first pixels PX1) (referred to herein "bright seam").

$$\text{De-blur\#1} = \text{Ref} - \frac{\sum_{Blurred} \text{Captured}(x, y)}{\text{Num(panels)}} \quad \text{Equation 1}$$

$$\text{De-blur\#1} = \text{Ref} + \frac{\sum_{Blurred} \text{Captured}(x, y)}{\text{Num(panels)}} \quad \text{Equation 2}$$

In Equation 1 and Equation 2 above, Ref is a reference value, and corresponds to a value that is obtained by dividing a value obtained by adding a reference value Left-Ref of a left display device LDD and a reference value Right-Ref of a right display device RDD by 2. The value of Ref is expressed as an equation as follows.

$$\text{Ref} = \frac{(\text{Left} - \text{Ref}) + (\text{Right} - \text{Ref})}{2} \quad \text{Equation 3}$$

The reference value Left-Ref of the left display device LDD corresponds to a luminance value of the first unit pixel PX1 positioned closest to the boundary area BA (e.g., the first unit pixels PX1' that are not affected by the blur caused by the light receiving element). In addition, the reference value Right-Ref of the right display device RDD corresponds to a luminance value of first unit pixel PX1' positioned closest to the boundary area BA (e.g., the first unit pixels PX1' that are not affected by the blur caused by the light receiving element).

Num (panels) corresponds to the number of display devices DD that form one boundary area BA, and may have two values, according to some example embodiments. The $\Sigma_{blurred}$ captured(x,y) of a numerator corresponds to a value obtained by calculating a difference between the reference value (Ref) of each display device and the luminance value of each unit pixel from the luminance value of the unit pixel after the image mapping (which is affected by the blur effect), and adding each difference.

That is, during the first de-blurring operation, the de-blurring unit 220 may operate by reflecting the luminance value of the first unit pixel PX1' positioned closest to the boundary area BA in the first unit pixel PX1' (e.g., the first unit pixel PX1' that is not affected by the blur among the captured images).

Thereafter, the de-blurring unit 220 may derive a luminance value obtained by a second de-blurring operation through Equation 4 below. According to some example embodiments, the second de-blurring operation is referred to as a second de-blurring operation, and the luminance value obtained by the second de-blurring operation is referred to as a second de-blurring luminance value.

According to some example embodiments, the second de-blurring operation is for generating a more accurate correction value in which an initial luminance value is reflected, and Equation 4 may be applied to both, the dark seam case and the bright seam case without dividing the case of the dark seam and the case of bright seam.

$$\text{De-blur\#2}_{left} = \text{De-blur\#1} + (\text{De-blur\#1} * \text{Ratio}_{left})$$

$$\text{De-blur\#2}_{right} = \text{De-blur\#1} + (\text{De-blur\#1} * \text{Ratio}_{right}) \quad \text{Equation 4:}$$

Here, a value of $\text{Ratio}_{left}$ and a value of $\text{Ratio}_{right}$ are expressed by the following equations.

$$\text{Ratio}_{left} = \frac{(\text{Captured}_{left}) - (\text{Captured}_{avg})}{\text{Captured}_{avg}} \quad \text{Equation 5}$$

$$\text{Ratio}_{right} = \frac{(\text{Captured}_{right}) - (\text{Captured}_{avg})}{\text{Captured}_{avg}} \quad \text{Equation 6}$$

Here, captured$_{left}$ corresponds to an initial luminance value of the second unit pixel PX2' of the left display device LDD, and captured$_{right}$ corresponds to an initial luminance value of the second unit pixel PX2' of the right display device RDD. Captured$_{avg}$ corresponds to an average value. The value of the captured$_{avg}$ is expressed by the following equation.

$$\text{Captured}_{avg} = \frac{(\text{Captured}_{left}) + (\text{Captured}_{right})}{2} \quad \text{Equation 7}$$

That is, during the second de-blurring operation, the de-blurring unit 220 may calculate the correction value of the second pixel PX2 by reflecting the operation value determined by the first de-blurring operation and the initial luminance value of the second unit pixel.

The de-blurring unit 220 may derive the luminance correction value of the second pixel PX2 using Equations 1 to 7 described above.

Referring to FIGS. 9A, 9B, 9C, and 9D, a method by which the de-blurring unit 220 derives the luminance correction value of the second pixel PX2 is described in more detail.

First, referring to FIG. 9A, a state in which the first unit pixels and the second unit pixels are mapped by the image mapping unit 210 is shown.

According to some example embodiments, FIG. 9A shows a case where a unit pixel for six pixels positioned in the first row in each of the left display device LDD and the right display device RDD adjacent to each other is mapped, but the disclosure is not limited thereto. The arrangement and number of unit pixels may be variously changed.

Here, it is assumed that first unit pixels LPX11, LPX12, and LPX13 in first to third columns of the left display device LDD are not affected by the blur by the light receiving element and first unit pixels LPX14 and LPX15 and a second unit pixel LPX2 in fourth to sixth columns of the left display device LDD are affected by the blur. In addition, it is assumed that first unit pixels RPX11, RPX12, and RPX13 in first to third columns of the right display device RDD are not affected by the blur and first unit pixels RPX14 and RPX15 and a second unit pixel RPX2 in fourth to sixth columns of the right display device RDD are affected by the blur.

Figure 9C:
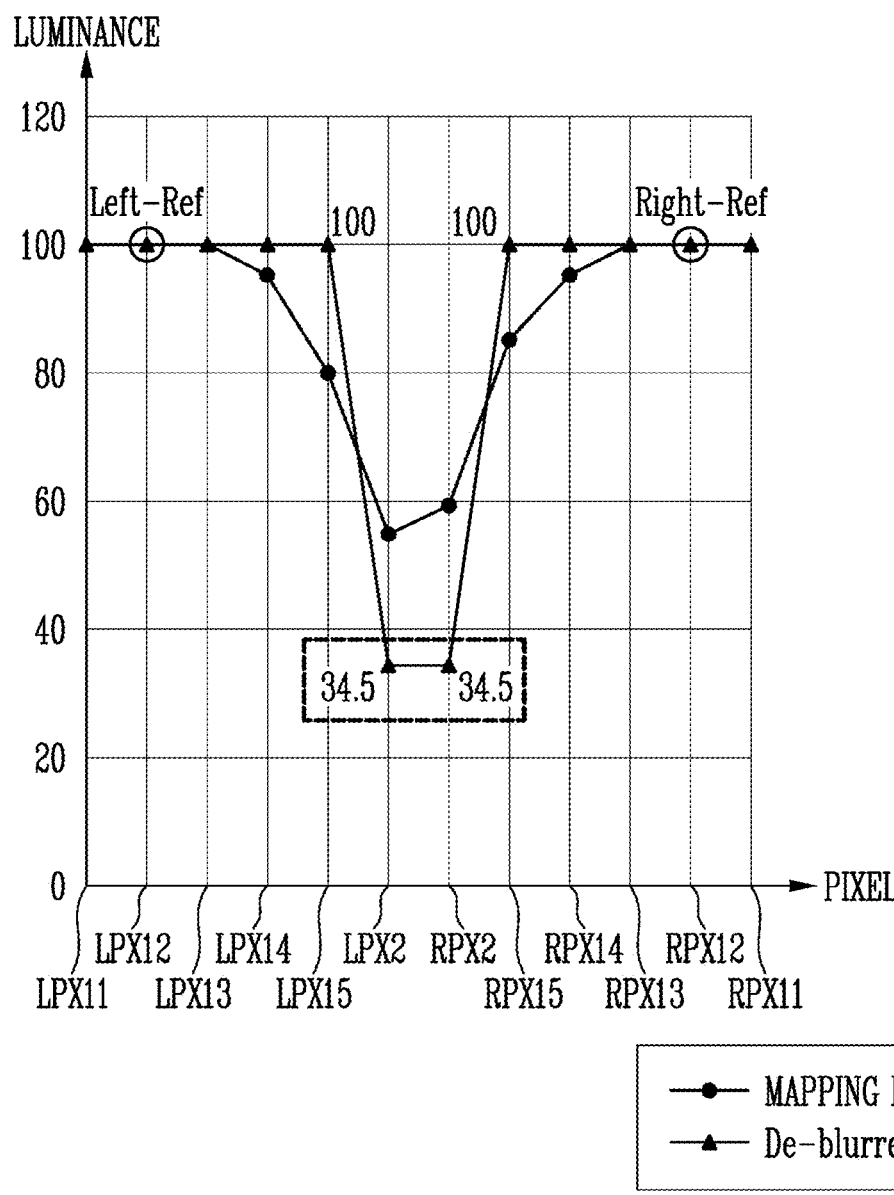
Figure 9D:
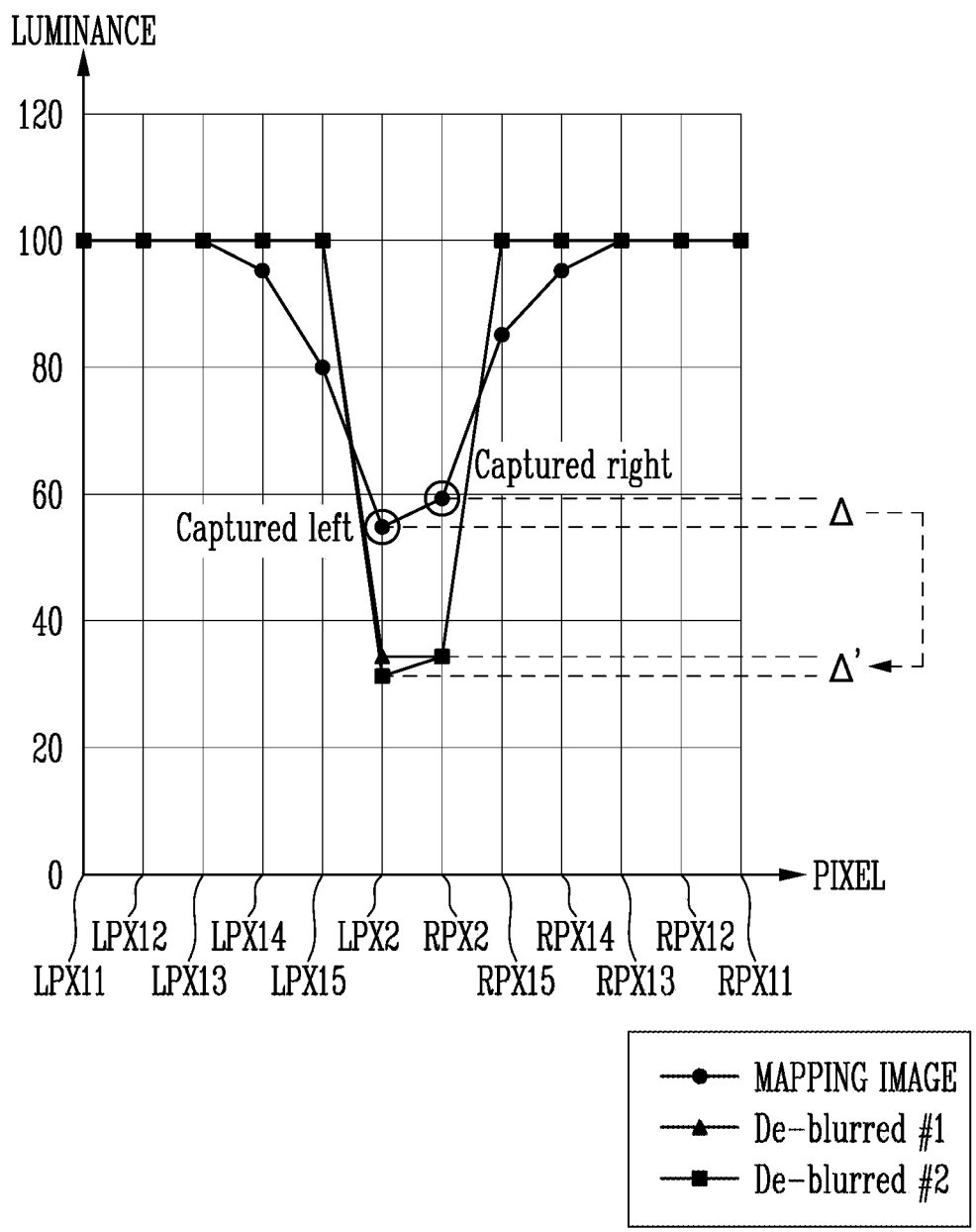

FIGS. 9B to 9D show a luminance value corresponding to the 12 unit pixels shown in FIG. 9A.

Referring to FIG. 9B, each of the luminance values of the first unit pixels LPX11, LPX12, and LPX13 in the first to third columns of the left display device LDD is 100 and each of the luminance values of the first unit pixels LPX14 and LPX15 and the second unit pixel LPX2 in the fourth to sixth columns of the left display device LDD is 95, 80, and 55, respectively. In addition, each of luminance values of the first unit pixels RPX11, RPX12, and RPX13 in the first to third columns of the right display device RDD is 100 and each of luminance values of the first unit pixels RPX14 and RPX15 and the second unit pixel RPX2 in the fourth to sixth columns of the right display device RDD is 95, 85, and 59, respectively.

According to some example embodiments, FIGS. 9A to 9D shows a case where the boundary area is the dark seam, and the first de-blurring operation may be performed according to Equations 1 and 3 as described above.

Here, the reference value Left-Ref of the left display device LDD is 100, which is the luminance value of the first unit pixel LPX13 in the third column. The reference value Right-Ref of the right display device RDD is 100, which is the luminance value of the first unit pixel RPX13 in the third column. Accordingly, the reference value Ref calculated through Equation 3 is 100.

In order to obtain the $\Sigma_{blurred}$captured(x,y) value of the numerator in Equation 1, first, the $\Sigma_{blurred}$captured(x,y) value of the left display device LDD uses the luminance value of the first unit pixels LPX14 and LPX15 and the second unit pixel LPX2 in the fourth to sixth columns, which are affected by the blur in the left display device LDD.

Because each of the luminance values of the first unit pixels LPX14 and LPX15 and the second unit pixel LPX2 is 95, 80, and 55, respectively, the $\Sigma_{blurred}$captured(x,y) value of the left display device is 5+20+45=70. The $\Sigma_{blurred}$captured(x,y) value of the right display device RDD uses the luminance value of the first unit pixels RPX14 and RPX15 and the second unit pixel RPX2 in the fourth to sixth columns, which are affected by the blur in the right display device RDD. Because each of the luminance values of the first unit pixels RPX14 and RPX15 and the second unit pixel RPX2 is 95, 85 and 59, respectively, the $\Sigma_{blurred}$captured(x,y) value of the right display device is 5+15+41=61. That is, the $\Sigma_{blurred}$captured(x,y) value of the numerator in Equation 1 is 131.

When the above-described reference value, $\Sigma_{blurred}$captured(x,y) value is applied to Equation 1, the correction luminance value of the second pixel PX2 obtained by the first de-blurring operation is derived as 34.5.

Referring to FIG. 9C, the luminance of the second pixel PX2 corresponding to the second unit pixels LPX2 and RPX2 in the left display device LDD and the right display device RDD is corrected as 34.5 by the first de-blurring operation. Here, because a total amount of light by the luminance of the pixels affected by the blur is the same, the luminance of the first unit pixels may be corrected to a reference value (for example, 100).

According to some example embodiments, the de-blurring unit 220 derives the correction luminance value of the second pixel through Equations 4 to 7 as described above in order to generate a more accurate correction value.

In order to obtain a value of Captured$_{avg}$, refer to FIG. 9B again. Because the initial luminance value of the second unit pixel LPX2 of the left display device LDD is 55 and the initial luminance value of the second unit pixel RPX2 of the right display device RDD is 59, the value of the Captured$_{avg}$ is (55+59)/2=57.

A value of Ratio$_{left}$ is (55−57)/57=−2/57, and a value of Ratio$_{right}$ is (59−57)/57=2/57.

When substituting in Equation 4 and deriving the luminance correction value of the second pixel PX2 in the left display device LDD, 34.5+34.5*(−2/57)=33.29 is derived by reflecting the luminance value (34.5) obtained by the first de-blurring operation. When deriving the luminance correction value of the second pixel PX2 in the right display device RDD, 34.5+34.5*(2/57)=35.71 is derived by reflecting the luminance value (34.5) obtained by the first de-blurring operation.

Referring to FIG. 9D, the correction luminance value of the second pixel PX2 derived by the de-blurring unit 220 may be checked. As described above, when the initial luminance value of the second unit pixel is reflected, the luminance value of the second pixel PX2 may be different in the left display device LDD and the right display device RDD.

According to some example embodiments, the correction unit 230 calculates the correction grayscale value corresponding to the calculated correction luminance value of the second pixel PX2. The correction unit 230 may calculate a grayscale value according to the luminance value using a grayscale-luminance (or intensity) function.

The correction unit 230 may calculate the correction grayscale value through a difference in a grayscale value corresponding to the correction luminance value of the second pixel PX2 derived from the de-blurring unit 220 and a grayscale value corresponding to a target luminance value of the second pixel PX2.

According to some example embodiments, the correction unit 230 may calculate the correction grayscale value through a linear interpolation method as shown in Equation 8 below.

$$Est_{Comp} = V^n_{Comp} + (V^{n+1}_{Comp} - V^n_{Comp}) \frac{G^{Est}_C - G^n_C}{G^{n+1}_C - G^n_C} \qquad \text{Equation 8}$$

Here, Est$_{comp}$ is the correction grayscale value, $V^n_{comp}$ is a correction value at $G^n_c$, $G^n_c$ is an n-th reference grayscale, $G_c^{EST}$ means a current grayscale value.

Referring to FIG. 10, the grayscale-luminance (or intensity) function is shown. A grayscale function Original (De-blurred) according to the correction luminance value $I_M$ of the second pixel PX2 derived from the de-blurring unit 220 is shown as a dotted line, and a grayscale function Compensation Target according to the target luminance value $I_T$ of the second pixel PX2 is shown by a solid line.

The grayscale according to the luminance value $I_M$ of the second pixel PX2 derived from the de-blurring unit 220 may be a Gc value, and the grayscale according to the target luminance value $I_T$ of the second pixel may be a $G_T$ value. That is, the correction unit 230 may calculate a correction grayscale value (Gc−$G_T$=ΔGray, Compensation value).

The correction unit 230 provides the calculated correction grayscale value to the timing controller 10 of FIG. 6 and/or the data driver 20 of FIG. 6, and the data driver 20 generates a corrected data signal (or data voltage) corresponding to a corresponding grayscale. The data driver 20 may apply the corrected data voltages to the data lines D1 to Dm connected to the second pixels PX2.

Accordingly, in the display device according to some example embodiments, visibility of the boundary area may be reduced, and thus an image having a uniform luminance as a whole may be displayed.

According to some example embodiments, as illustrated in FIG. 7, the luminance correction unit 200 may be included in the display device DD, but the disclosure is not limited thereto. According to some example embodiments, the mapping unit 210 and the de-blurring unit 220 may be included in the external image capture unit 100, and the correction unit 230 or a lookup table LUT of the correction grayscale value may be included in the timing controller 10 or the data driver 20.

Hereinafter, an improvement effect of the display device according to some example embodiments is described with reference to FIGS. 11 and 12.

Figure 11:
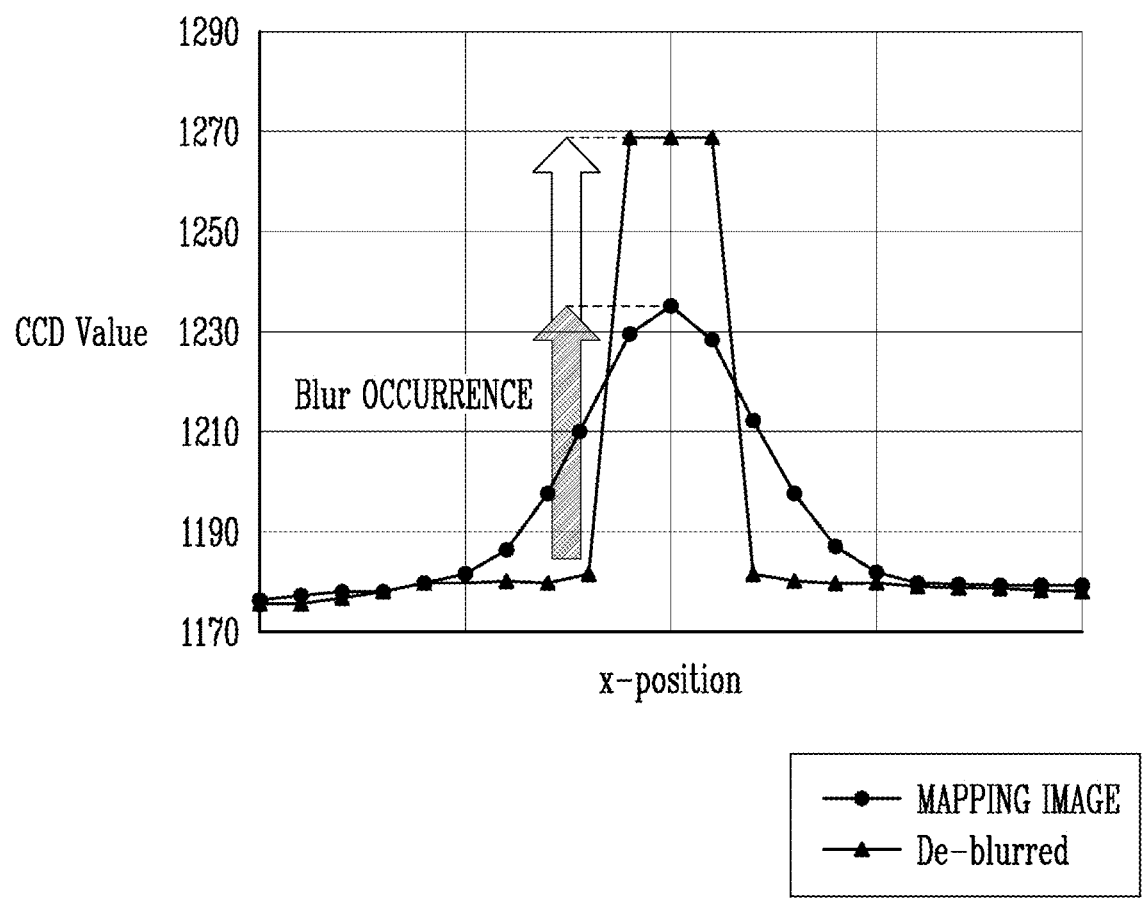
FIG. 11 is a diagram illustrating an effect in which a depth of a pixel of the boundary area is improved in the display device, according to some example embodiments.

FIG. 11 is a diagram illustrating an effect in which a depth of the pixel of the boundary area is improved in the display device according to some example embodiments, and FIG. 12 is a diagram illustrating an effect in which the visibility of the boundary area is reduced in the display device according to some example embodiments.

Referring to FIG. 11, a brightness CCD value of the pixel according to an x-position of the plurality of display devices is shown.

A brightness of the unit pixel mapped by the image mapping unit 210 and a brightness of the pixel de-blurred by the de-blurring unit 220 are shown.

The middle area may correspond to the boundary area BA of FIG. 2 between the plurality of display devices DD, and the brightness of the pixel de-blurred by the de-blurring unit 220 may be brighter than the brightness of the unit pixel mapped by the image mapping unit 210.

In FIG. 11, improvement of the depth of the pixel in the boundary area BA may mean that the visibility of the boundary area BA is weakened (or reduced) and the overall luminance is increased.

Referring to FIG. 12, a grayscale image of the boundary area BA between the plurality of display devices DD is shown. In the plurality of display devices DD according to a comparative example, the boundary area BA is recognizable (or noticeable) in 64 grayscale, 128 grayscale, and 192 grayscale. On the other hand, in the display device DD according to some example embodiments, the visibility of the boundary area BA may be weakened or reduced, and thus the boundary area BA may not be as distinguishable.

In addition, Table 1 below shows a visibility index in the display device according to the comparative example and the display device according to some example embodiments. A larger value of the visibility index means that the boundary area is more recognizable, and a smaller value means that the boundary area is less recognizable.

TABLE 1

| Division | Experiment 1 | Experiment 2 | Experiment 3 |
|---|---|---|---|
| Comparative example | 2.87 | 5.72 | 8.11 |
| Embodiment | 1.06 | 2.55 | 4.00 |
| Improvement rate | 63% | 57% | 51% |

The display device according to some example embodiments may have an improvement rate of 50% or more than the display device according to the comparative example. That is, in the display device according to some example embodiments, the visibility of the boundary area may be weakened or reduced, and thus an image having a more uniform luminance as a whole may be displayed. Hereinafter, a method of compensating for a luminance is described with reference to FIG. 13.

FIG. 13 is a flowchart illustrating a method of compensating for a luminance of the display device according to some example embodiments. FIG. 13 is described with reference to the display device and the luminance correction unit of the display device of FIGS. 1 to 12 described above.

First, the luminance correction unit 200 receives the luminance image of the first pixel PX1 and the second pixel PX2 captured by the image capture unit 100 (S200).

The image mapping unit 210 maps the luminance image of the first unit pixel PX1' and the second unit pixel PX2' by using the received luminance image (S210). The image of the first unit pixel PX1' may correspond to the captured luminance image of the first pixel PX1, and the image of the second unit pixel PX2' may correspond to the luminance image in which the captured luminance image of the second pixel PX2 and the luminance image of the boundary area BA adjacent to the second pixel PX2 are reflected.

The de-blurring unit 220 receives the mapped unit pixel image from the image mapping unit 210 and performs the de-blurring operation (S220). The de-blurring unit 220 may calculate the luminance correction value of the second pixel PX2 through the first de-blurring operation and the second de-blurring operation.

The correction unit 230 calculates the correction grayscale value of the second pixel PX2 corresponding to the calculated luminance correction value of the second pixel PX2 (S230).

The correction unit 230 provides the calculated correction grayscale value to the timing controller 10 of FIG. 6 and/or the data driver 20 of FIG. 6, and the data driver generates the corrected data signal (or data voltage) corresponding to the corresponding grayscale. The data driver 20 may apply the corrected data voltages to the data lines D1 to Dm connected to the second pixels PX2 (S240).

According to some example embodiments, the luminance correction value of the second pixel PX2 may vary according to the width of the boundary area BA between the plurality of display devices DD. When the width of the boundary area BA between the plurality of display devices DD is narrower than the distance between the adjacent first pixels PX1, the corrected luminance value of the second pixel PX2 may be a value less than that of the luminance value of the first pixel PX1.

That is, when the width of the boundary area BA is narrower than the distance between the first pixels PX1 therein, the display device DD according to some example embodiments may correct the luminance so that the luminance of the second pixels PX2 adjacent to the boundary area BA is darker than the luminance of the first pixels PX1. Accordingly, in the multi-screen display device TDD arrangement, the visibility of the boundary area BA may be reduced, and thus an image of a more uniform luminance as a whole may be displayed.

On the other hand, when the width of the boundary area BA between the plurality of display devices DD is wider than the distance between the adjacent first pixels PX1, the corrected luminance value of the second pixel PX2 may be a value greater than that of the luminance value of the first pixel PX1.

That is, when the width of the boundary area BA is wider than the distance between the first pixels PX1 inside, the display device DD according to some example embodiments may correct the luminance so that the luminance of the second pixels PX2 adjacent to the boundary area BA is brighter than the luminance of the first pixels PX1. Accordingly, in the multi-screen display device TDD arrangement, the visibility of the boundary area BA may be reduced, and thus an image of a more uniform luminance as a whole may be displayed.

Although the disclosure has been described with reference to the example embodiments described above, those skilled in the art or those having common knowledge in the art will understand that the disclosure may be varied, modified, and/or changed without departing from the spirit and technical area of the disclosure described in the claims.

Therefore, the technical scope of the disclosure should not be limited to the contents described in the detailed description of the specification, but should be defined by the claims and their equivalents.

What is claimed is:

1. A display device comprising:
   a plurality of display panels adjacent to each other, each display panel comprising a first pixel in the display panel and a second pixel in the display panel and adjacent to a boundary area of the display panel; and
   a luminance correction circuit configured to generate a correction grayscale value for the second pixel,
   wherein the luminance correction circuit is configured to:
   map a captured luminance image to a unit pixel image comprising a first unit pixel image of a first unit pixel and a second unit pixel image of a second unit pixel, the second unit pixel image reflecting the captured luminance image of the second pixel and the boundary area;
   perform a de-blurring operation on the mapped unit pixel image to calculate a correction luminance value for the second pixel and reflect a luminance value of the first unit pixel positioned closest to the boundary area; and
   calculate a correction grayscale value for the second pixel corresponding to the calculated correction luminance value of the second pixel.

2. The display device according to claim 1, wherein a width of the boundary area is narrower than a distance between adjacent first pixels, and the corrected luminance value for the second pixel is less than a luminance value of the first pixel.

3. The display device according to claim 1, wherein a width of the boundary area is wider than a distance between adjacent first pixels, and the corrected luminance value for the second pixel is greater than a luminance value of the first pixel.

4. The display device according to claim 1, wherein the first unit pixel image reflects the captured luminance image of the first pixel.

5. The display device according to claim 4, wherein the de-blurring operation to calculate the correction luminance value of the second pixel comprises a first de-blurring operation and a second de-blurring operation.

6. The display device according to claim 5, wherein the first unit pixel is not affected by blur of the captured images during the first de-blurring operation.

7. The display device according to claim 6, wherein the de-blurring operation to calculate the correction luminance value of the second pixel comprises reflecting an operation value determined by the first de-blurring operation and an initial luminance value of the second unit pixel during the second de-blurring operation.

8. The display device according to claim 1, wherein the correction grayscale value of the second pixel is calculated as a difference between a grayscale value corresponding to a target luminance value of the second pixel and a grayscale value corresponding to a correction luminance value of the second pixel.

9. The display device according to claim 8, wherein each of the plurality of display panels comprises:
   a display unit comprising the first pixel and the second pixel; and
   a data driver configured to apply a data voltage to a plurality of data lines coupled to the first pixel and the second pixel.

10. The display device according to claim 9, wherein the data driver is configured to apply a corrected data voltage corresponding to the correction grayscale value of the second pixel to data lines connected to the second pixel.

11. A display device comprising a plurality of display panels adjacent to each other with a boundary area interposed between the plurality of display panels, the display device comprising:
    a display unit comprising a first pixel in the display unit and a second pixel adjacent to the boundary area of the plurality of display panels;
    a data driver configured to apply a data voltage to a plurality of data lines coupled to the first pixel and the second pixel;
    a luminance correction circuit configured to:
    map a captured luminance image to a unit pixel image comprising a first unit pixel image of a first unit pixel image and a second unit pixel image of a second unit pixel, the second unit pixel image reflecting the captured luminance image of the second pixel and the boundary area;
    perform a de-blurring operation on the mapped unit pixel image to calculate a correction luminance value of the second pixel and reflect a luminance value of the first unit pixel positioned closest to the boundary area; and
    calculate a correction grayscale value of the second pixel corresponding to the calculated correction luminance value of the second pixel.

12. The display device according to claim 11, wherein the data driver is further configured to apply a corrected data voltage corresponding to the correction grayscale value of the second pixel to data lines coupled to the second pixel.

13. The display device according to claim 11, wherein the first unit pixel image reflects the captured luminance image of the first pixel.

14. The display device according to claim 13, wherein the de-blurring operation to calculate the correction luminance value of the second pixel comprises a first de-blurring operation and a second de-blurring operation.

15. The display device according to claim 14, wherein the first unit pixel is not affected by blur of the captured images during the first de-blurring operation.

16. The display device according to claim 15, wherein the de-blurring operation to calculate the correction luminance value of the second pixel comprises reflecting an operation value determined by the first de-blurring operation and an initial luminance value of the second unit pixel during the second de-blurring operation.

17. A method of compensating for a luminance of a display device comprising a plurality of display panels adjacent to each other with a boundary area interposed between the plurality of display panels, the method comprising:
    receiving a captured luminance image of a first pixel and a captured luminance image of a second pixel;
    mapping the luminance image of the first pixel and the luminance image of the second pixel, respectively, to an image of a first unit pixel and a second unit pixel, the image of the second unit pixel reflecting the captured luminance image of the second pixel and the boundary area;

performing a de-blurring operation on the mapped images of the first unit pixel and the second unit pixel to calculate a correction luminance value for the second pixel and reflect a luminance value of the first unit pixel positioned closest to the boundary area; and calculating a correction grayscale value of the second pixel by using a luminance correction value of the second pixel obtained by the de-blurring operation.

18. The method according to claim 17, further comprising:

applying a data voltage corresponding to the calculated correction grayscale value of the second pixel to the second pixel.

19. The method according to claim 18, further comprising compensating a luminance value of the second pixel with a luminance value less than a luminance value of the first pixel, wherein a width of the boundary area is narrower than a distance between adjacent first pixels.

20. The method according to claim 18, further comprising compensating a luminance value of the second pixel with a luminance value greater than a luminance value of the first pixel, wherein a width of the boundary area is wider than a distance between adjacent first pixels.

* * * * *

UNITED STATES PATENT AND TRADEMARK OFFICE
CERTIFICATE OF CORRECTION

| | | |
|---|---|---|
| PATENT NO. | : 11,404,026 B2 | Page 1 of 1 |
| APPLICATION NO. | : 17/231992 | |
| DATED | : August 2, 2022 | |
| INVENTOR(S) | : Se Yun Kim et al. | |

It is certified that error appears in the above-identified patent and that said Letters Patent is hereby corrected as shown below:

In the Claims

Column 18, Line 28, Claim 11       Before "and"
delete "image"

Signed and Sealed this
Twenty-sixth Day of September, 2023

Katherine Kelly Vidal
*Director of the United States Patent and Trademark Office*